Nov. 15, 1955  J. B. HINSHAW  2,723,509
SHAPER KNIFE GRINDING JIG
Filed April 24, 1953

John B. Hinshaw
INVENTOR.

BY *Clarence A. O'Brien*
*and Harvey B. Jacobson*
Attorneys

United States Patent Office 2,723,509
Patented Nov. 15, 1955

2,723,509

SHAPER KNIFE GRINDING JIG

John B. Hinshaw, Royal Center, Ind.

Application April 24, 1953, Serial No. 350,801

1 Claim. (Cl. 51—216)

The present invention relates to certain new and useful improvements in a manually maneuverable jig characterized by specially designed and systematically arranged facilities cooperating with each other in supporting and moving a shaper knife in a manner whereby the desired surfaces of the blades of the knife may be properly and satisfactorily ground.

Briefly summarized, the preferred embodiment of the invention has to do with a simple, practical and economical jig comprising a base having a precision-ground bottom contactable with and movable over a drill press table toward and from a rotating grinding wheel which is operably mounted on said table, and cutter retaining and stabilizing means fixedly mounted atop said base, said means being adapted to slidingly guide each cutter blade, while properly held, into grinding relation with said grinding wheel.

More specifically, the above stated means embodies, as one of its features, a cutter blade rest having an anvil surface of requisite form for accomplishing the expected tooth grinding result and includes, in addition, a stub shaft or an equivalent spindle on which the cutter is removably mounted, said shaft being located in a prescribed position relative to the anvil surface.

In carrying out the principles of the invention the stated jig functions to hold triple-lip wood shaper knives or cutters wherein the hub portion has a bore and wherein two stub shafts of different diameters serve to accommodate a shaper knife having either a one-half inch bore or a bore of a lesser diameter, as the case may be.

Another object of the invention, in addition to providing the selectively usable shafts for differently sized shaper knives, has to do with shafts which are so arranged as to permit the knives to be readily put in position or removed, the shafts so cooperating with their respective anvil surfaces as to permit the blade which is being held down and ground to be maintained in this position by exerting pressure against the next adjacent cutter tooth.

A more general object of the invention is to provide a grinding jig the construction of which makes it satisfactory and possible to construct the jig from milled steel blocks screwed together or as a cast unit and ground to size and shape with the shafts either screwed in place or permanently mounted as desired.

Other objects, features, and advantages will become more readily apparent from the following description and accompanying sheet of drawings.

In the drawings, wherein like numerals are employed to designate like parts throughout the views.

Figure 1:
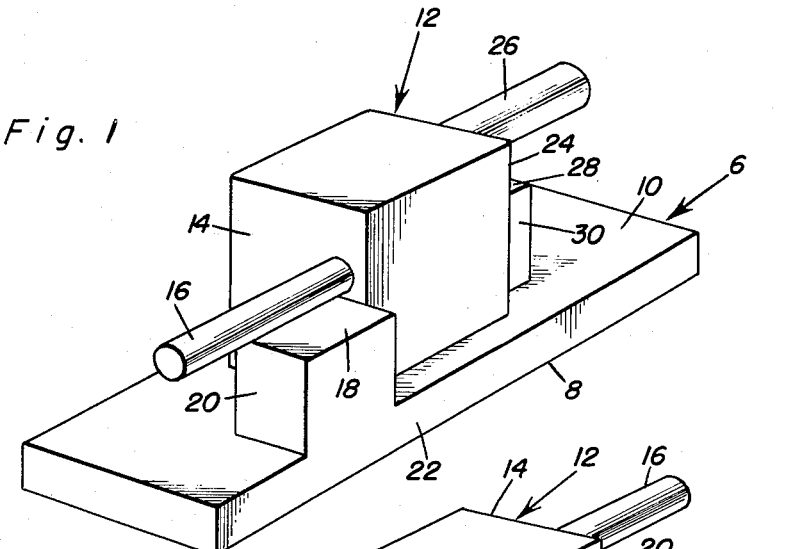
Figure 1 is a perspective view of a jig constructed in accordance with the principles of the present invention.
Figure 2:
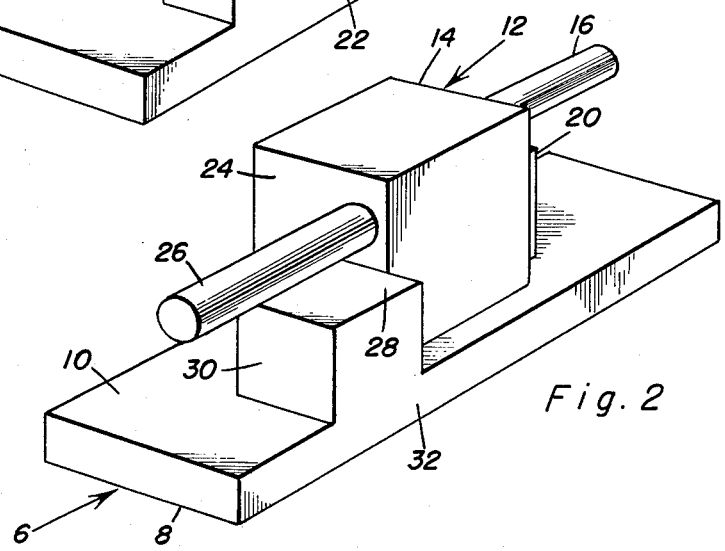
Figure 2 is likewise a perspective view of the same with the jig turned around and with the larger shaft on the left and the smaller one on the right, the two views showing both ends of the construction; and, Figure 3 is an end elevation of the structure seen in Figure 2 and wherein the work piece, the shaper knife is in place and showing how the grinding step is accomplished.

The preferred embodiment of the invention is depicted in the several figures and, as already stated, the novel jig comprises a main body portion which may be conveniently described as the base 6. This is shown as generally rectangular in plan but it could, of course, be of some other marginal shape. It is preferred, however, that the bottom or underside 8 shall be flat and precision ground for accurate movable contact with a stationary support surface such as a drill press table (not shown). It is also preferred that the top surface 10 be flat, as shown. At the approximate center of the lease there is an integral upright of rectangular block-like form which may be treated as a mount 12. That is to say, on one flat vertical side 14 the smaller stub shaft or spindle 16 is mounted. This may be integral or screwed into a socket (not shown). In any event, it is in a horizontal plane and spaced above and parallel to the base. The attached end thereof overlies the flat top surface 18 of the post-like work rest 20. The rest 20 is also in the form of a block and the upper flat horizontal surface forms an anvil. This work rest is adjacent to the longitudinal edge 22 of the base. On the opposite side 24 of the mount 12 is the horizontally disposed larger spindle or stub shaft 26. This is also at right angles to the surface 24, parallel to the top of the base and is so positioned that it overlies the anvil forming surface 28 of the second block-like work rest 30. The latter is adjacent to the longitudinal edge 32 of the base. This means, therefore, that the respective rests and shafts are offset in respect to the longitudinal center line of the base. It follows, therefore, that the work rests are out of line with each other and are situated on opposite sides 14 and 24 of the intervening mount or upright means 12. The outer ends of the shafts protrude beyond the work rests to facilitate application and removal of the work-piece. This takes the form of a standard 3-lip wood shaper cutter A having a hub portion B carrying customary circumferentially spaced lips or blades C, D and E. The usual cup-shaped grinder is denoted at F and is carried by an operating stem or arbor G operable from a drill press (not shown) shaft.

Figure 3:
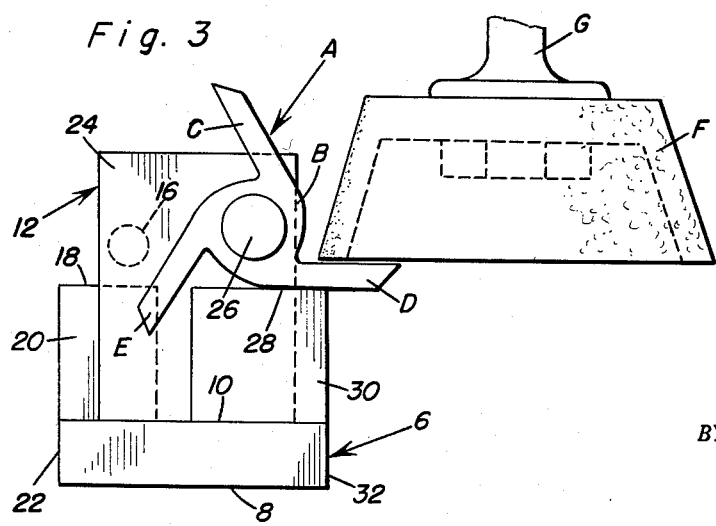

By placing the work piece, that is, the hub portion thereof on the selected shaft, either 16 or 26, and depending on the size of the bore in the hub, the work-piece takes the position seen in Figure 3. That is to say, the blade D is down on the anvil 28 where it is stabilized and held against displacement and the uppermost blade C is in a position so that it may be pushed against with a thumb or finger to keep the shaper cutter in place while it is being ground against the grinder F. It will be evident, therefore, that the shaper cuter is placed on the selected shaft and held down on the stop block or rest by hand. The jig is then slid back and forth under the cup-shaped grinding wheel which latter is said to take a very slight cut. Figure 3 shows the manner in which the jig, grinder and work-piece cooperate in bringing about the desired tooth grinding result.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A manually maneuverable holding and grinding jig for standard three-lip wood shaper cutters having hub bores of either one-half inch or five-sixteenths inch in diameters, respectively, comprising a base rectangular in plan and having a precision ground flat bottom contactable with and shiftable movable over a flat-surfaced drill press table toward and from a rotating cutter grinding wheel which is operably mounted over said table, a block-like upright integral with and rising perpendicularly from the top of the base and situated centrally of said base and rectangular in cross-section and of a cross-section less than the width of the base and having opposite vertical surfaces spaced inwardly from median portions of the longitudinal edges of said base, the remaining vertical sides of said upright being spaced inwardly from the respective transverse ends of said base, a first block-like cutter steadying rest affixed atop said base adjacent to one vertical side of said upright and having a flat upper end forming an anvil, the latter being disposed in a horizontal plane below the upper end of said upright, a horizontal stub shaft secured at one end to and projecting laterally beyond the last-named side of said upright and overlying said anvil in vertically spaced parallelism and having a free end projecting beyond the rest in the direction of one transverse end of said base plate, a second block-like cutter steadying rest also affixed atop said base and situated adjacent to but on the opposite side of said upright and having a flat upper end providing a second anvil which is coplanar with the first-named anvil, and a second horizontal stub shaft secured to and projecting laterally beyond said opposite side of said upright and overlying said second anvil in vertically spaced parallelism with its outer end projecting beyond the stated second steadying rest in a direction toward the other transverse end of said base, the respective outer vertical surfaces of the respective block-like rests being flush with the respective longitudinal edge portions of the base whereby the corresponding vertical surfaces of said uprights are spaced inwardly therefrom in a manner to provide the intended and necessary clearance for the cutter grinding wheel when the jig, as a unit, is moved to bring the intended blade or lip of the spacer cutter into position in respect to said cutter grinding wheel.

References Cited in the file of this patent

UNITED STATES PATENTS

| | | |
|---|---|---|
| 609,301 | Scull | Aug. 16, 1898 |
| 1,436,436 | Poole et al. | Nov. 21, 1922 |
| 2,397,860 | Hodgdon | Apr. 2, 1946 |
| 2,414,285 | Bloomingburg | Jan. 14, 1947 |